(DIGITAL LIGHT DEFLECTOR)

(AMPLITUDE MODULATOR)

(ANALOG DEFLECTOR)

INVENTORS: W. A. BONNER
J. E. GEUSIC
L. G. VAN UITERT

BY:
ATTORNEY

United States Patent Office 3,453,561
Patented July 1, 1969

3,453,561
DEVICES UTILIZING CRYSTALS OF $Pb_3MgNb_2O_9$
William A. Bonner, Scotch Plains, Joseph E. Geusic, Berkeley Heights, and Le Grand G. Van Uitert, Morris Township, Morris County, N.J., assignors to Bell Telephone Laboratories, Incorporated, Murray Hill and Berkeley Heights, N.J., a corporation of New York
Filed Aug. 8, 1966, Ser. No. 571,015
Int. Cl. H01s 3/14
U.S. Cl. 332—7.51      10 Claims This invention relates to devices utilizing a crystalline material of $Pb_3MgNb_2O_9$ and related compositions. Included devices depend for their operation upon the dependence of electromagnetic wave transmission properties upon the magnitude of applied electric field and are of particular interest for use over the wavelength range of from 5.8 microns to 0.45 microns.

In United States application Ser. No. 353,049, filed Mar. 19, 1964, now Patent No. 3,290,619 there is described a class of devices useful for the modulation of electromagnetic wave energy by use of an applied modulating electric field. The described devices depend for their operation upon the inclusion of an active material which is centrosymmetric, the exemplary class being the perovskites. It is there indicated that the dependence of electromagnetic wave transmission properties on applied voltage in such materials obeys a quadratic relationship, so permitting increasing modulation per unit applied voltage for increasing bias. Such devices typcally operate with D.C. bias voltages of the order of several kilovolts per centimeter so that half wave retardations may be attained by use of modulating voltages appreciably less than one kilovolt.

Devices of the described class have received considerable attention from workers in the art who, at a previous stage, had worked with non-centrosymmetric materials which typically required thousands of volts to produce a single phase retardation for crystal sizes which are generally available. The relationship of transmission property to applied voltage in the earlier class of materials is linear.

While there are several materials which show the quadratic relationship, much of the reported work has been directed to a mixed crystal of potassium tantalate (KT) and potassium niobate (KN) containing approximately equal amounts of the two end constituents and generally referred to as KTN. This composition is particularly appropriate for use in electro-optic devices operating over the temperature range including room temperature since its electro-optic activity is at a maximum under those conditions. KTN devices operating over a broad frequency range have been constructed and have been operated successfully. Widespread acceptance of this crystalline material has, however, not yet come about, largely due to (1) lamellar defects which often occur during growth and which result in some light scattering and (2) a change in characteristics during long-term biasing, probably due to electron and/or ion migration under the influence of the large applied fields. Various techniques have been proposed for overcoming both of these difficulties on a production basis, and it is quite possible that KTN will some day realize its promise commercially.

Lead magnesium niobate, $Pb_3MgNb_2O_9$, is a perovskite, one of a class of centrosymmetric materials which may therefore be biased to result in a reduced required applied modulating field for a given degree modulation, as necessarily follows from its crystalline nature. It is considered particularly useful in the class of devices under discussion by reason of its favorable electro-optic coefficient over the operating range of from about −30 to about 100 degrees centigrade. Unlike KTN, lead magnesium niobate is a unique composition and inherently has a peak electro-optic activity in the room temperature region. Whereas permited KTN compositions may grow with equal facility over the entire compositional range between KT and KN, the composition $Pb_3MgNb_2O_9$ may form only with a three-to-one-to-two atomic ratio of lead to magnesium to niobium. It is immediately apparent that this fact simplifies growth, and, indeed, the lamellar defects in KTN attributed to small compositional variations are so avoided.

Lead magnesium niobate typically has an electrical resistivity of the order of $10^{16}$ ohm-centimeter or greater, that is, roughtly 4 orders of magnitude greater than that of KTN. Such resistivity values indicate a virtual absence of electron or ion migration in response to a field. Long-term biasing has produced little or no change in characteristics, as illustrated by no noticeable change in properties in 100 hours when biased at 10 kilovolts per centimeter. By contrast, KTN crystals having a resistivity of the order of $10^{12}$ ohm-centimeter show a large change in the uniformity of phase retardation in less than 1 hour for an applied field of 5 kilovolts per centimeter.

Lead magnesium niobate, like KTN, is ferroelectric, and maximum electro-optic activity is realized in the region of the ferroelectric transition temperature. Whereas the transition in KTN and other mixed crystals previously investigated is fairly sharp, the transition in lead magnesium niobate is far more gradual. Such a gradual change in spontaneous polarization with temperature, referred to as a second order transition, results in an increase in temperature stability for devices incorporating this material.

In accordance with this invention it has been found that the perovskite, $Pb_3MgNb_2O_9$, and certain related compositions which have been modified by inclusion of additional ingredients, have large electro-optic coefficients over a useable temperature range including room temperature while manifesting the quadratic dependence of transmission property on applied eletcric field associated with all centrosymmetric crystals. Lead magnesium niobate has an absorption edge at about 0.45 micron, and it is transparent to a wavelength of at least 5.8 microns. This defines the preferred frequency range of operation of the devices of this invention, and it is intended that the descriptive terminology "electro-optic" device or material include this range even though it extends beyond the visible.

For convenience, certain physical and electrical properties of lead magnesium niobate are set forth:

Electrical resistivity.—Typically of the order of $10^{16}$ ohm-centimeters or higher
Absorption edge.—About 0.45 micron
Index of refraction.—2.5 at 0.6560 micron, 2.7 at 0.5400 micron
Electrical Q.—From about 100 to 500 over a temperature range down to about five degrees above the transition
Dielectric constant.—At one kilocycle and seven degrees centigrade, 12,750 for zero bias, 8,000 for 9.6 kilovolt per centimeter bias
Optical extinction.—Above 15 db with 10 kilovolts per centimeter bias for crystal length resulting in $\lambda/2$ retardation, where $\lambda$ equals wavelength
$\lambda/2$ retardation for a cube at 0.6328 micron.—800 volts per centimeter for zero bias, 200 volts per centimeter for 10 kilovolt per centimeter bias
Curie temperature.—−9 degrees centigrade at 1 kilohertz
Temperature stability.—Dielectric constant within ± one percent over 40 degree temperature range under bias of 10 kilovolt per centimeter Hardness.—Comparable to quartz, about 6 mhos Stability.—Good both physically and chemically, not readily soluble in acids or bases Growth.—Larger specimens by Kyropoulos technique from flux.

Electrode connection may be made by evaporation of, for example, silver or aluminum or by use of a capacitive mount. Temporary electrodes may be made by use of indium gallium eutectic.

The mechanism responsible for operation of electro-optic devices of the type to which the invention is directed are well understood by those skilled in the art. While a detailed description is therefore not warranted, it is convenient to set forth a brief description to expedite further discussion. Lead magnesium niobate, either modified or not, is essentially cubic above the transition temperature at which the devices are generally operated. Accordingly, ordinary and extraordinary beams of the electromagnetic wave energy are affected equally during transmission. The effect of applying an electric field, generally at an angle of 45 degrees with respect to the direction of polarization of the transmitted beam, is to affect the velocity of transmission unequally with respect to directions parallel and perpendicular to the applied field. In practice these directions are usually along crystallographic axes. In effect, the velocity perpendicular to the field is decreased substantially, while the velocity orthogonal thereto is increased substantially. In all the devices to which the description is directed a beam of plane polarized electromagnetic wave energy of suitable wavelength is introduced at an angle intermediate the two directions (parallel and perpendicular to the applied field), so that it is effectively broken up into two beams. With no field applied, the velocities of the two beams are equal, and there is no effect other than an equal retardation of both beams. With the field applied, one beam is retarded while the other is advanced, so that there is an effective continual rotation of the vector resolution of the two beams during transmission. By appropriate choice of transmission length so as to avoid the position at which the two beams are brought back into phase, it is possible to produce any desired degree of rotation for any given magnitude of applied field. The "rotation" so resulting may serve in digital fashion to permit selection of one or the other of the two significant beam directions in a uniaxial material, as in a light deflector (see FIG. 1 and accompanying description) or may be used in analog fashion as in a continuous modulator (see FIG. 2 and description).

Description of the invention is facilitated by reference to the drawing, in which.

Figure 1:
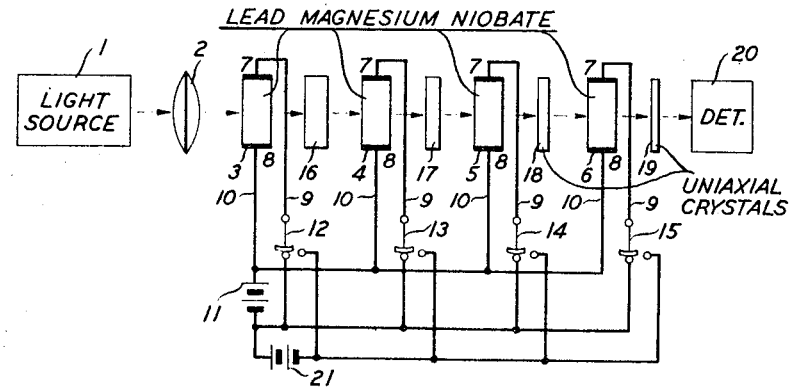
FIG. 1 is a schematic representation of a digital light deflector utilizing crystals of $Pb_3MgNb_2O_9$ as rotating media.

Referring again to FIG. 1, the device depicted is a digital light deflection unit of the type described in copending application Ser. No. 239,948, filed Nov. 26, 1962. The device may be employed in a wide variety of systems including information storage, retrieval, telephone switching, optical data communication, computer, etc. The device depicted includes polarized light source 1, lens 2, $Pb_3MgNb_2O_9$ rotating elements 3, 4, 5, and 6, each having associated electrodes 7 and 8, to which are attached leads 9 and 10, respectively, in turn attached to biasing sources 11 and 21 through shorting switches 12, 13, 14, and 15, uniaxial crystals 16, 17, 18 and 19, each in succession being half the thickness in the direction of transmission of the preceding member of the series and, finally, detector 10. The operation of this device in a specific application is discussed in Example 1. Very briefly, this device depends for its operation on the ability of a uniaxial material to displace polarized light having a polarization direction other than parallel or normal to the unique axis. For a normal direction of polarization, light transmission obeys Snell's law. The function of the rotating elements is, as the name implies, to rotate the source of polarization by 90 degrees, so as to permit through-transmission or displaced transmission in the following uniaxial elements 16 through 19. Polarized light is produced at source 1 and is focused through lens 2. The field necessary to bring about a $\pi$ rotation in the biased crystal is produced by D.C. source 21 and is applied to any of the desired rotating elements 4 through 6 by means of shorting switches 12 through 15, so completing the electrical circuit across concerned electrodes 7 and 8. As has been indicated, since the field required to produce a $\pi$ rotation decreases quadratically with increasing bias, it is desirable to have a fixed bias across the $Pb_3MgNb_2O_9$ crystals, constituting rotating elements 3 through 6. Such fixed bias is applied by means of D.C. source 11. Detection is accomplished at element 20. The precise position of a light spot leaving uniaxial element 19 is dependent on the presence or absence of field in each of rotating elements 3 through 6. As illustrated in Example 1, feasible designs may result in 250,000 light positions per square inch.

Figure 2:
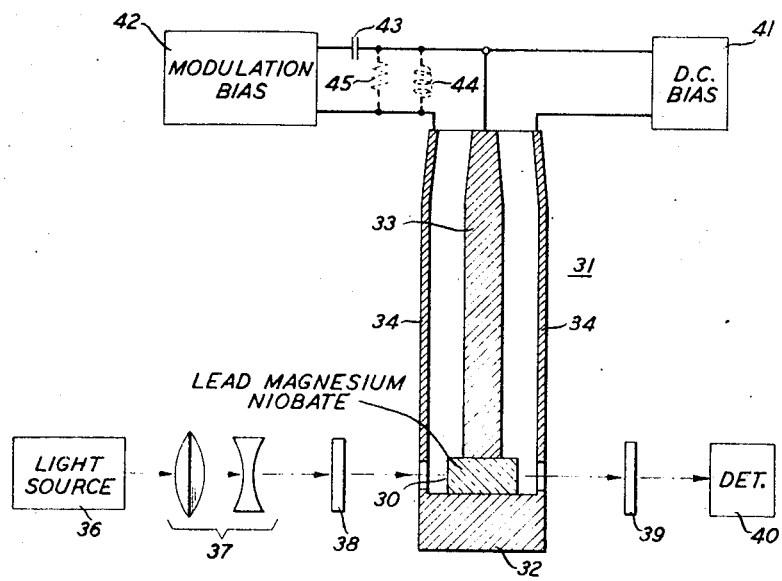
FIG. 2 is a sectional view of a modulator which may operate as a baseband or resonant device.

The device of FIG. 2 is an amplitude modulator which may operate as a baseband modulator or as a resonant device. It consists of $Pb_3MgNb_2O_9$ crystal 30, placed within coaxial configuration 31, consisting of platform 32, inner conductor 33, and outer conductor 34. Polarized light produced from laser or other source 36 is focused by means of a Galilean telescope 37 and passes through polarizer 38 before reaching crystal 30. Upon leaving crystal 30, the light beam passes through analyzer 39, which in the simplest embodiment is a crossed polarizer. Upon leaving analyzer 39, the beam is then detected by an amplitude detector system 40. Crystal 30 is maintained biased to $n+\frac{1}{2}\pi$ rotations by D.C. bias source 41. As has been indicated, the purpose of the fixed bias is to permit low voltage rotation due to the quadratic relationship between rotation and applied field. Modulation information is introduced by means of modulation bias source 42, which is isolated from D.C. bias source 41 by capacitor 43. The maximum bias produced by source 42 is that necessary for complete $\pi$ rotation at the applicable D.C. level. The sense of plane polarization produced by element 38 and the crystallographic positioning of element 30 is such that the sense of polarization produced is at 45 degrees to two principal axes of the $Pb_3MgNb_2O_9$ crystal. With zero modulation, the crystal is essentially isotropic, so that the velocity of propagation through the crystal is equal in all directions. For any other condition, a phase retardation results along one of the principal directions, so resulting in rotation. This is seen at detector 40 as a variation in amplitude resulting from the varying amount of light passed by analyzer 39 as the rotated energy conforms more or less to the direction of polarization of this element.

Operating as a base band modulator, the device of FIG. 2 is useful from D.C. up to 100 or a few hundred megacycles, with power dissipated in the sample at a level of the order of 3½ milliwatts (see Example 2). For higher frequencies, it is useful to operate as a resonant device. This may be accomplished by use of an element depicted as lumped inductance 44 and resistance 45, shown in dashed lines. The value of inductance 44 is so chosen as to satisfy the relationship $$f = \frac{1}{\sqrt{LC}}$$

for resonance at the desired frequency. The effective resistance 45 determines the value of Q, i.e.

$$Q = \frac{W}{\Delta W} = \frac{R}{L}$$

Figure 3:
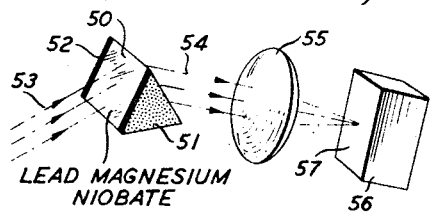
FIG. 3 is a perspective view of an alternate form of modulator utilizing a crystal of $Pb_3MgNb_2O_9$.

In FIG. 3, there is shown one form of analog deflector operating over the visible and near visible spectrum. The device is depicted schematically as including a prism of KTN having electrodes affixed at 51 and 52, said electrodes being connected with D.C. biasing source and A.C. modulating source, for example, in the manner discussed in connection with FIG. 2 (not shown). Polarized light, shown as arrows 53, is introduced into prism 50 from a source not shown. Polarized light, shown as arrows 54, leaves prism 50 and is focused by lens 55 on position-sensitive detector 56. The amount of deflection introduced by prism 50 is dependent on the index of refraction which is, in turn, field dependent. In this manner, the magnitude of the field across prism 50 within a maximum range necessary to produce a maximum phase retardation produces a light spot at 57 which has unique reference to the applied voltage. Detector 56 may utilize, for example, a fixed aperture or apertures at the focal plane of 55 and may measure the intensity or simply the presence or absence of light at any given position.

The device of FIG. 3 may be used either alone or in conjunction with an additional prism such as 50 having its bisecting plane normal to that of prism 50 (so permitting two-way deflection). In a display arrangement for this purpose, detector 56 may take the form of a phosphorescent screen.

Illustrative examples are set forth below to demonstrate the magnitude of change of dielectric constant which may be accomplished for some biasing conditions. A detailed theoretical discussion of the mechanism responsible for the dependence of dielectric constant or index of refraction on applied field is not considered appropriate to this description. In terms of voltage gradients, it has been found that typical operating conditions may result in a half wave retardation with an applied voltage of as little as 50 volts or less. Field requirements for a given number, $n$ of $\pi$ phase shifts follow the equation $$V_{n\pi} = \sqrt{n} V_\pi \qquad (1)$$

in which $V_{n\pi}$ is the voltage gradient required for $n\pi$ phase shifts, $n$ equals number of phase shifts, and $V_\pi$ equals voltage required to produce $\pi$ phase rotation. Accordingly, the seventh $\pi$ phase point results upon application of $\sqrt{7}$, or $2.64 \times V_\pi$, which, as $V_\pi$ equals 800 volts, results in a requirement of 2100 volts. The eighth $\pi$ rotation at these levels results upon application of an additional 200 volts. The limitation on the D.C. bias is the breakdown voltage gradient that can be applied to the crystal, which is greater than 25,000 volts/cm. for this material.

The power required to charge and discharge the capacitance of the modulator at some rate, R, may be determined from:

$$P_c = \tfrac{1}{2} C V^2_{(n \to n+1)\pi} R \qquad (2)$$

in which $P_c$ is the power required in watts, C is the capacitance of the modulator in farads, and R equals the repetition rate in pulses per second. $V_{(n \to n+1)\pi}$ in Eq. (2) equals $$\sqrt{n+1} - \sqrt{n} V_\pi \approx \frac{1}{2\sqrt{n}} V_\pi$$

and is the applied R.F. field gradient that must be applied to result in an additional $\pi$ phase shift.

Power dissipated in the crystal, $P_s$, is determined from:

$$P_s = P_c / Q \qquad (3)$$

where Q is the $n$ factor in dimensionless units.

The following examples are indicative of typical operating parameters:

EXAMPLE 1

This example relates to the operation of the digital light deflector of FIG. 1. It is premised on a detector 20 capable of yielding 250,000 bits/sq. in. Rotating elements such as 3 through 6 are of dimensions 1 cm. x 1 cm. x 1 cm. The crystal has the $Pb_3MgNb_2O_9$. The dielectric constant, $\epsilon$, is about 8,000 under bias conditions. Biasing each crystal out to the 7½th $\pi$ phase point requires, for these dimensions, approximately 2100 volts, with, as has been discussed, 200 volts being required for a complete eighth rotation. For this size modulator, $C = 640$ $\mu\mu$farads and required power, $P_c$, from Eq. (2) is equal to $1 \times 10^{-5}$ joules $\times$ R, which for R equals $10^7$ pulses/sec., i.e. 10 mc./sec. rate, equals 100 watts. From Eq. (3), and for a Q value of 300, $P_s$ (power dissipation) equals 100/300, or approximately 0.33 watt.

EXAMPLE 2

Operation of the baseband modulator of FIG. 2 and utilizing a crystal of 0.01" x 0.01" x 0.01" results in a required R.F. voltage, $V_{(7,8)\pi}$, of 40 volts. $V_{n\pi}$ for 7½ $\pi$ rotations equal 300 bolts. For one hundred percent modulation, the required power to be supplied by the modulator $P_c$ equals $5.6 \times 10^{-9}$ joules times the modulation bandwidth. For a modulation bandwidth of 250 mc./sec., $P_c$ equals 6.4 watts. $P_s$, for a Q of 300, is equal to 2.1 milliwatts.

It is well known that crystalline materials intended to transmit wave energy, particularly at higher frequencies, such as in the visible and near visible spectrum, are desirably as nearly perfect as possible. It is well known that optimum transmission properties are obtained by the elimination of inclusions, strains and other defects of sizes approaching or exceeding the wavelength of the energy to be transmitted. The $Pb_3MgNb_2O_9$ crystals of this invention are no exception. To aid the practitioner, a suitable growth procedure which resulted in certain of the crystals from which the measured properties here included were derived, is described.

The single crystal growth technique utilized was a modification of that of Kyropoulos. Growth was on an oriented seed which was lifted at a rate of about one-third of an inch a day, while being rotated at a rate of about 40 r.p.m. to minimize problems which may have their origin in compositional gradients in the melt. The melt was composed of PbO, MgO, $Nb_2O$ and $B_2O_3$. The $B_2O_3$ additons were required to suppress volatilization of PbO and decrease the viscosity of the melt. The melts of concern fuse at approximately 1200 degrees C. Initial ingredients were rendered molten in a 300 cc. crucible by use of silicon carbide heating elements controlled by a saturable core reactor so as to maintain the temperature at the bottom of the crucible at about 1225° C. An oxygen-containing atmosphere such as air or oxygen was found desirable.

To produce the desired crystal composition the amount of PbO in the melt on the same basis ranges from about 55 to 80 mole percent depending upon $B_2O_3$ content and resulting melt viscosity. $Nb_2O_5$ is used in less than stoichiometric proportions to avoid $Pb_2Nb_2O_7$ formation.

Typical melt compositions are summarized in the following table:

| | Mole percent |
|---|---|
| PbO | 55–80 |
| MgO | 5–25 |
| $Nb_2O_5$ | 4–15 |
| $B_2O_3$ | 6–20 |

For Kyropoulos growth it has been found that best results are obtained for a melt having approximately the composition listed in the following table. Both, mole percentages and weights in a typical melt are given.

| | Mole percent |
|---|---|
| PbO (670 gms.) | 60 |
| MgO (40 gms.) | 20 |
| $Nb_2O_5$ (80 gms.) | 6 |
| $B_2O_3$ (49 gms.) | 14 |

Discussion has been in terms of the material $$Pb_3MgNb_2O_9$$

and such composition is to be preferred for the described uses. Adjustment in certain of the characteristics of this material may be accomplished by altering the composition. For example, the transition temperature may be increased, so increasing the electro-optic activity for higher temperature operation by partial substitution of zinc or scandium for magnesium. Lead scandium niobate, $Pb_2ScNbO_6$, has a transition temperature of about 100 degrees centigrade as compared with the —9 degree centigrade transition for lead magnesium niobate. Substitution of one atom of zinc for each atom of magnesium in $Pb_3MgNb_2O_9$ results in the expected increase in transition temperature. Scandium may be substituted for magnesium as well, with equivalent effect, however since its valence is 3+ rather than 2+, a change in stoichiometry results. Of course, use of such partial substitutions brings about some of the difficulties which have plagued persons concerned with KTN technology, since such substituted compositions no longer have the invariant stoichiometry to which lead magnesium niobate owes its simplicity of growth. Difficulties associated with composition variations are however minimized due to the very gradual ferroelectric transition temperature and the concomitant temperature stability of the material. Other variations in the composition may be made for this or other purposes known to those skilled in the art. It is considered that the advantages accruing to lead magnesium niobate are largely retained where substitutions replace up to half the magnesium ions. Other substitutions include nickel, iron, cobalt, and manganese.

The general description of crystal growth is not to be considered limiting. While the Kyropoulos technique described is suitable for the production of large flawless crystals, other techniques may be utilized. Spontaneous nucleation from a flux has been utilized with some success, although to obtain a large yield it was helpful to increase the nutrient to flux ratio over that used in Kyropoulos growth. The stockbarger technique, or any other procedure which may accommodate the starting ingredients may be used. Other starting ingredients may be substituted so that, for example, lead or magnesium may be introduced as oxides or niobates.

The invention has been described in terms of a limited number of device embodiments. An important aspect of the invention is considered to derive from the discovery that the dependence of the variation of refractive index or dielectric constant on applied electric field can be made high in this material and that this can be achieved stably with low loss. This discovery is considered to be of value in any device in which transmitted electromagnetic wave energy is in any way modified by changing or adjusting refractive index or dielectric constant under the influence of an applied electric field. Such an effect is considered to be of value in any device design accommodating any wave energy which can be passed through the $Pb_3MgNb_2O_9$, that is, any wave energy of a frequency or frequencies outside of the principal absorption which has been noted.

The descriptive matter relating to compositional considerations and actual growth conditions is included for the assistance of the practitioner. For certain applications, compositional tolerances, particularly for unintentional impurities, can be quite high. Alternate single crystal growth techniques are known and may be utilized.

What is claimed is:
1. Device comprising a body consisting essentially of $Pb_3MgNb_2O_9$ containing as a partial replacement for magnesium from zero atom percent to 50 atom percent of an element selected from the group consisting of zinc, scandium, nickel, iron, cobalt, and manganese, together with first means for applying an electric field across at least a portion of the said body and second means for transmitting electromagnetic wave energy through a portion of the said body, the said first and second means being such that the presence of an electric field increases the birefringence of the said body for the said wave energy.
2. Device of claim 1 in which the said electromagnetic wave energy is plane polarized and within the wavelength range of from 5.8 microns to 0.45 micron.
3. Device of claim 2 in which the said second means provides for the introduction of the said wave energy into the said body as plane polarized energy noncoincident with a major crystallographic axis of the said body.
4. Device of claim 2 together with means for introducing the exiting plane polarized wave energy into a uniaxial crystal having a unique axis defining an angle which is acute with respect to the direction of propagation of the said wave energy into the said uniaxial crystal.
5. Device of claim 2 together with means for directing the exiting plane polarized wave energy into a polarizing medium.
6. Device of claim 5 in which the plane of polarization of the said polarizing medium coincides with the plane of polarization of the wave energy introduced into the said body.
7. Device of claim 2 in which the plane of polarization of the said wave energy as introduced into the said body coincides with a major crystallographic axis of the said body.
8. Device of claim 2 in which the entrance and exit surfaces of the said body for the said wave energy are nonparallel.
9. Device of claim 1 in which the said second means comprises at least one electrode contacting the said body.
10. Device of claim 1 in which the said second means comprises a cavity substantially enclosing the said body.

References Cited

UNITED STATES PATENTS 3,290,619   12/1966   Geusic et al. _____ 332—7.51

JOHN KOMINSKI, *Primary Examiner.*

D. R. HOSTETTER, *Assistant Examiner.*

U.S. Cl. X.R.

350—150, 160